(12) United States Patent
Block et al.

(10) Patent No.: US 6,904,868 B2
(45) Date of Patent: Jun. 14, 2005

(54) INTERACTIVE MOBILE FOOD DISPENSER

(76) Inventors: Robert S. Block, 13044 Mindanao Way #5, Marina del Ray, CA (US) 90292; Patric R. Martin, 1264 9th St. #8, Santa Monica, CA (US) 90404

( * ) Notice: Subject to any disclaimer, the term of this patent is extended or adjusted under 35 U.S.C. 154(b) by 0 days.

(21) Appl. No.: 10/617,728

(22) Filed: Jul. 14, 2003

(65) Prior Publication Data

US 2004/0059466 A1 Mar. 25, 2004

Related U.S. Application Data

(60) Provisional application No. 60/395,354, filed on Jul. 12, 2002.

(51) Int. Cl.[7] .............................................. A01K 1/10
(52) U.S. Cl. ................................ 119/51.12; 119/57.92; 119/707
(58) Field of Search .......................... 119/51.11, 51.12, 119/61.5–61.56, 57.92, 707

(56) References Cited

U.S. PATENT DOCUMENTS

| 3,874,341 | A | * | 4/1975 | Riba ........................ 119/51.12 |
| 4,306,329 | A | * | 12/1981 | Yokoi ........................... 15/319 |
| 4,391,224 | A | * | 7/1983 | Adler .......................... 119/707 |
| 5,129,361 | A | * | 7/1992 | Deutsch et al. ........... 119/51.12 |
| 5,560,316 | A | | 10/1996 | Lillelund et al. |
| 5,572,955 | A | | 11/1996 | Boshears |
| 5,575,241 | A | | 11/1996 | Line |
| 5,657,721 | A | * | 8/1997 | Mayfield et al. ............. 119/707 |
| 5,669,328 | A | * | 9/1997 | Lanfranchi ................ 119/57.92 |
| 5,673,651 | A | | 10/1997 | Udelle et al. |
| 5,675,225 | A | | 10/1997 | Moore et al. |
| 5,755,184 | A | | 5/1998 | Neidenberger |
| 5,765,508 | A | * | 6/1998 | Markowitz ................... 119/707 |
| 5,778,825 | A | | 7/1998 | Krietzmen et al. |
| 5,782,207 | A | | 7/1998 | Goodham |
| 5,785,005 | A | | 7/1998 | Udelle et al. |
| 5,865,146 | A | | 2/1999 | Markham |
| 5,893,791 | A | | 4/1999 | Wilkinson |
| 5,899,367 | A | | 5/1999 | Strength et al. |
| 5,934,968 | A | | 8/1999 | Lin |
| 5,965,182 | A | | 10/1999 | Lindgren |
| 6,003,470 | A | | 12/1999 | Budman |
| 6,044,797 | A | * | 4/2000 | Leason et al. ................. 119/72 |
| 6,055,932 | A | | 5/2000 | Weber |
| 6,076,226 | A | * | 6/2000 | Reed ............................ 15/319 |
| 6,098,571 | A | | 8/2000 | Axelrod et al. |
| 6,129,053 | A | | 10/2000 | Markham et al. |
| 6,149,490 | A | | 11/2000 | Hampton et al. |
| 6,167,841 | B1 | | 1/2001 | Ho |
| 6,237,538 | B1 | | 5/2001 | Tsengas |
| 6,311,640 | B1 | | 11/2001 | Mercado |

* cited by examiner

*Primary Examiner*—Teri Pham Luu
*Assistant Examiner*—Kimberly S. Smith
(74) *Attorney, Agent, or Firm*—Burns, Doane, Swecker & Mathis, LLP

(57) ABSTRACT

A mobile food dispenser includes a shell, a controller, at least one drive motor for moving the dispenser across a surface in response to direction from the controller, at least one sensor configured to detect the presence of an animal, and at least one compartment including a hatch mechanism for controlling an animal's access to the interior of the compartment, wherein the hatch mechanism is actuated by the controller, and wherein the controller is configured to move the dispenser and actuate the hatch mechanism to stimulate an animal, in response to a detected presence of the animal.

23 Claims, 3 Drawing Sheets

INTERACTIVE MOBILE FOOD DISPENSER

This non-provisional patent application claims priority from U.S. Provisional Application No. 60/395,354 filed on 12 Jul. 2002.

BACKGROUND

Many pets such as dogs and cats spend their days confined indoors, exercising only to move from a couch or resting place to a food dish and back. According to a study performed by the Ralston Purina Company in October 2000, 38% of pet owners never exercise their pets or take their pets for walks, and 18% of pet owners consider their pets to be overweight. Without sufficient exercise, many pets must be coaxed to eat, or coaxed to exercise.

SUMMARY

A mobile food dispenser includes a shell, a controller, at least one drive motor for moving the dispenser across a surface in response to direction from the controller, at least one sensor configured to detect the presence of an animal, and at least one compartment including a hatch mechanism for controlling an animal's access to the interior of the compartment, wherein the hatch mechanism is actuated by the controller, and wherein the controller is configured to move the dispenser and actuate the hatch mechanism to stimulate an animal, in response to a detected presence of the animal.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION OF THE EXEMPLARY EMBODIMENTS

Figure 1:
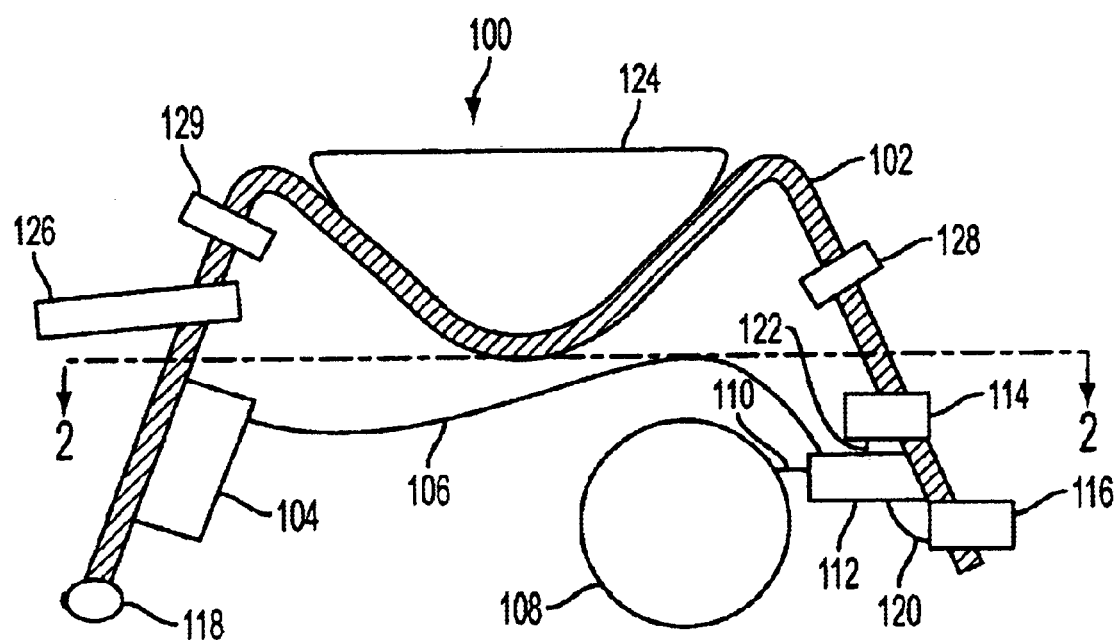
FIG. 1 illustrates a lateral section view of an exemplary embodiment of the present invention.

As shown in FIG. 1, an exemplary embodiment of a mobile interactive food dispenser 100, including an outer shell 102 with an optional dish or liner/insert 124 for holding food or water. As shown in FIG. 1, the top of the cone is hollowed out to form a depression, into which food or liquid can be placed, or a dish or liner such as the liner 124 which can receive food or liquid. The liner 124 can easily be removed, for example for cleaning. Liners of different forms can also be provided, for example in an open form of a cup, or with a lid, latch, or other mechanism to increase the effort the pet must exert to obtain food from the liner and/or stimulate playfulness of the pet. The dispenser 100 includes a wheel 108, a controller 112, proximity switches 116, 126, a microphone 128, an optical sensor 129, and a rangefinder 114. The dispenser 100 also includes a battery pack 104 and a low-friction nub or wheel 118. Electrical lines 106, 110, 122, 120 respectively connect the battery pack 104, a motor driving the wheel 108, the rangefinder 114, and the proximity switch 116 to the controller 112. Electrical lines also connect the proximity switch 126, the optical sensor 129 and the microphone 128 to the controller 112, but are not shown in FIG. 1.

Figure 2:
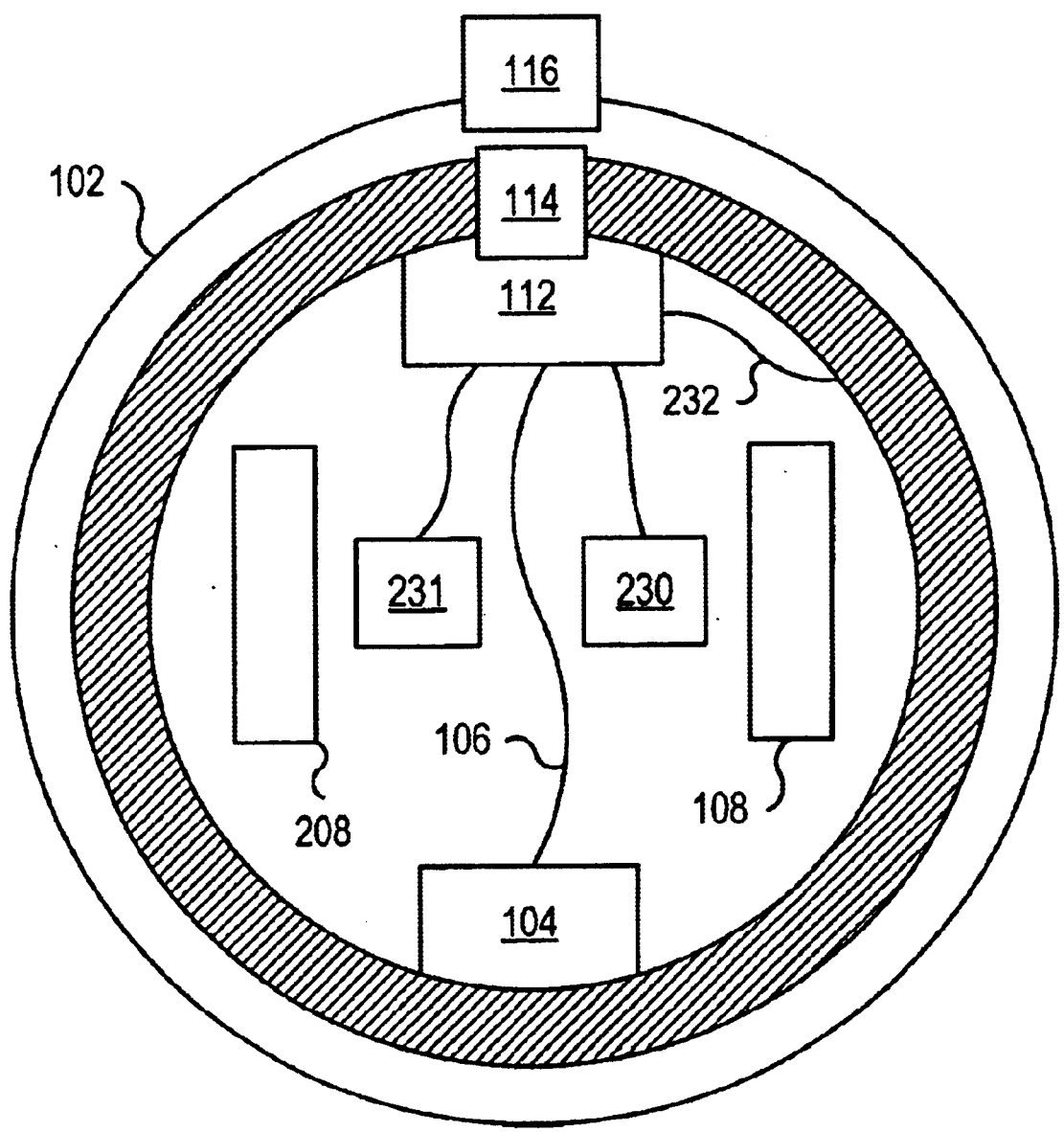
FIG. 2 illustrates an overhead sectional view along the lines 2—2 of the embodiment shown in FIG. 1.

FIG. 2 shows an overhead sectional view of the dispenser 100 along the lines 2—2 of FIG. 1. As can be seen in FIG. 2, the dispenser 100 further includes a wheel 208 and motors 231, 230 that drive the wheels 208, 108 and are controlled by the controller 112. The controller 112 can also connect to a radio frequency antenna 232 and can include radio signal circuitry so that the dispenser 100 can be remotely controlled and/or broadcast information. Alternatively or additionally, the dispenser 100 can be remotely controlled via infrared signals or other light-frequency signals via the optical sensor 129 or another optical sensor of the dispenser 100. The optical sensor 129 can also provide information to the controller 112 regarding an ambient light level. The dispenser 100 can also be equipped with one or more motion-detecting sensors. The rangefinder 114 can be implemented using optical technology, sound/sonar technology, or any other range-finding technology. In addition, the dispenser 100 can be equipped with multiple sensors, for example multiple rangefinders, multiple proximity switches, multiple optical sensors, multiple motion-detecting sensors, and so forth. Sensors can be variously located on different surfaces of the dispenser 100, or within the dispenser 100. Multiple sensors of various kinds can be evenly spaced about the external surface of the dispenser 100, or can be spaced with varying concentrations. For example, a front surface or other surface of the mobile dispenser where greater sensitivity or information is desired or greater activity is expected, can be equipped with more sensors or more accurate sensors. For example, the front surface can be more likely to impact with objects or the dispenser 100 may require information about the environment ahead of it in a direction the dispenser is moving, and therefore more and/or greater quality sensor on or directed to the front surface can be desirable. The proximity switches 126, 116 can be spring loaded switches that close or open a contact when pressed and thereby emit a signal or a different signal to the controller 112. Alternatively, the proximity switches can be capacitance-sensitive or resistance sensitive so that when they contact an object, they emit a signal based on electrical properties of the object. Thus the dispenser 100 can employ sensors that can identify objects, and distinguish their quality or nature (for example, whether an object is a couch, a pet, or a human being). By way of further example, the optical sensor 129 can be an infrared sensor that the controller 112 can use to detect heat signatures of objects in the environment surrounding the dispenser 100, and recognize characteristic heat signatures of pets and/or human beings. The controller 112 can also use other sensory information in addition to or instead of the optical sensor to identify objects, for example by analyzing and recognizing sounds such as those emitted by pets of a particular type (e.g., a dog's bark) or a particular pet's sound (e.g., the bark of a particular dog or breed/size of dog) or speech commands spoken by a human being.

In an exemplary embodiment of the invention where the dispenser can recognize and distinguish pets, human beings, and also animals that do not fit the recognition profile of a class of pets or of a particular pet, the dispenser can act in a first fashion toward a recognized pet, for example cajoling the pet to exercise and/or eat, and can act in a second fashion toward other identified or mystery animals. For example, if the dispenser 100 recognizes a raccoon or non-pet animal in its proximity at night, it can raise an alarm and/or follow a programmed series of actions to drive the intruding animal away, protect a nearby pet from the intruding animal, for example by attacking the intruder or luring it away from the pet, or protect itself by seeking concealment, completely restricting access to its food stores, or jettisoning its food stores (which can function to lure the intruding animal away from both the pet(s) and the dispenser 100).

In an exemplary embodiment of the invention, the outer shell 102 of the food dispenser 100 is made of rubberized plastic or any other material that can withstand bites, scratches and buffeting from pets. The shape of the food dispenser 100 is basically a truncated cone to ensure good lateral stability, but other shapes can be used. For example, pseudo-limbs or other protuberances designed to engage the pet's interest or enhance the intensity of interaction between the dispenser 100 and the pet can be provided.

FIG. 2 shows that the dispenser 100 can be driven by two wheels 208, 108 that are independently actuated by electric motors 231, 230 under control of the controller 112. The controller 112 can include, for example, an integrated circuit or logic board, and/or a microcontroller, to receive and process digital and/or analog data received by various sensors of the dispenser 100, and control the motors 231, 230 accordingly. The controller 112 can drive the motors 231, 230 independently, for example by driving only one motor at a time, by driving both motors simultaneously at the same speed or at different relative speeds, in different rotational directions or in the same rotational direction. Thus the controller 112 can cause the dispenser to move and maneuver at different speeds and directions in both straight and curved lines, and rotate in place. Fewer or greater numbers of wheels and motors than those shown in FIG. 2 can be provided.

The battery pack 104 can be one or more rechargeable or non-rechargeable batteries, and can alternatively be a fuel cell, a solar cell or solar cell array, or any other source of power for motors that drive the wheels of the dispenser 100.

The nub or wheel 118 can include a pressure switch, so that when a force above a specific threshold pushes down on the dispenser 100 and activates the pressure switch, a signal is sent to the controller 112 so that the controller 112 can cease driving the wheels 208, 108 and/or can react by emitting a noise, flashing a light, or otherwise responding. Ceasing to drive the wheels can be desirable for example when a pet is pressing strongly on the dispenser 100, so that the motors 231, 230 are not burned out or damaged and/or excessive power from the battery pack 104 is not consumed.

The dispenser 100 can be equipped with lights in various numbers and of various types, intensities and colors, that can be actuated in response to different environmental conditions and/or behaviors of the pet, and/or can be part of a program to stimulate the pet. One or more externally visible lights or light sources can also indicate a status of the dispenser 100 to the user or pet owner, indicating for example a remaining energy level of the dispenser's on-board power source, successful communication with a wireless remote control unit handled by the user, remaining amount(s) of food stores in the dispenser 100, and a location of the dispenser 100 (e.g. a beacon or flashing light to help the user locate the dispenser in an environment). The dispenser can also provide a "light show" to stimulate one or more pets, for example by shining a light onto an object or surface to create a spot of light that the pet can chase, or that can chase the pet. Movement of the light can mimic prey movements, for example a series of short quick movements, that can be interspersed with periods of stillness or slower movements.

Access to the food in the dish 124 can also be controlled or metered according to a feeding schedule specified by a pet's owner, so that the controller 112 opens doors or access ports to the food in the dish 124 at scheduled times, and/or for limited periods of time. The dish 124 can include servo-operated access doors controllable by the controller 112, and can have multiple recesses or sections each with a separate door system, so that the controller 112 can selectively cause the dish 124 to allow the pet access to different portions or compartments of the dish 124. For example, the pet can be allowed access to a first food in the morning and then a second food in the evening, with intermittent snack foods of a third type during the day (or, in the case of a nocturnally active pet, during the night). The snacks can be periodically dispensed or proffered to the pet, or can be provided only when the pet performs a specific action or set of actions, or exceeds a threshold activity level. The dispenser 100 can also be provided with doors or access ports or hatches that contain or control access to the dish 124, for example when the dish 124 is configured without doors or other access-restricting devices.

In an exemplary embodiment, the feeding schedule can be altered or supplemented according to the pet's activity. For example, the controller 112 (which can include memory storage) can track a pet's behavior or activity level either in proximity to the dispenser 100 and/or in direct interaction with the dispenser 100 (as when the pet is playing with or responding to the dispenser 100). Based on the increased activity level detected by the controller 112, the controller 112 can shorten or accelerate the feeding cycle, increase the time window when the doors or access ports are opened to the pet. As an alternative to altering the schedule, the dispenser can allow access or dispense food in addition to the schedule. For example, when a detected amount of activity reaches a threshold, where for example the threshold can correlate to an estimated amount of calories expended by the pet, the controller 112 can cause doors of the dish 124 or doors or access hatches of the dispenser 100 surrounding the dish opening to open and allow the pet access to food in the dish 124. The regularly scheduled access can for example provide the pet with access to a first area of the dispenser 100 or dish 124 containing a first type of food, and the activity-based access can provide the pet with access to a different portion of the dispenser 100 or dish 124 containing a different type of food or treat. The regularly scheduled access can also be configured provide access to different portions or foods at different times, for example so that the owner can provide the pet with different kinds of foods at different times of the day.

The dispenser 100 can be configured with various sensors so that the controller 112 will know how much food or payload remains in the dispenser, how much of different kinds of foods remain in different portions of the dispenser 100 or dish 124, and so forth. The sensors can be pressure sensors at the bottom of a compartment that output signals corresponding to a weight or mass of food or payload in the compartment. Other kinds of sensors can also be used, for example optical sensors can be used to measure levels or presence of food or payload. The dispenser 100 can act differently, depending on how much food or payload remains and/or depending on how the pet has been acting. For example, if the sensors indicate that little food has been consumed or dispensed, the dispenser 100 can transition to more aggressive programs or actions to stimulate the pet to greater activity and/or appetite. For example, the dispenser can chase the pet, seek more frequently to attract the pet's attention, and so forth. If much food has been consumed or dispensed and the dispenser 100 discerns through its various sensors and memory that the pet has been eating much but exercising little, in this situation also the dispenser 100 can take more aggressive action to stimulate the pet to exercise. The dispenser 100 can also be programmed to dispense more food than usual when ambient temperatures drop below a threshold, to help the pet endure colder conditions.

The dispenser 100 can be controlled and/or programmed remotely by a user, for example through radio transmissions received by the controller 112 via the antenna 232, by infrared light signals and so forth, and the controller 112 can learn from or later imitate commands received from the user. The dispenser 100 can also be equipped with speech recognition capability, for example via the microphone 128 and speech recognition routines or software in the controller 112, so that the dispenser 100 can be controlled or activated via commands spoken by the user/pet owner. The controller 112 can include a memory provided with different programs that the user may select from. The different programs can include, for example, different behaviors designed to enable the dispenser to stimulate and interact with specific, different kinds of animals (for example dogs, cats, birds including parrots and macaws and cockateels and cockatoos, rats, ferrets, and so forth), to interact effectively with different animals of different ages and fitness levels, and so forth. The different behaviors can be designed to stimulate the natural instincts or sensibilities of the animal, for example food-gathering or hunting. For example, to interact with cats, the dispenser 100 might act in a prey-like manner or tease a cat via catnip loaded into a compartment of the dispenser 100 such as the dish 124 or a portion thereof. For dogs the dispenser 100 might brandish a treat that the dog is fond of, and then move so that the dog must chase the dispenser, and/or bark, etc. in order to obtain the treat. The dispenser 100 can also take advantage of surrounding environmental features or terrain. For example, the dispenser can lurk or gambol near climbable objects (whose location it discerns via sensors and/or explicit environmental mapping or instructions received from the user/pet owner) to encourage the animal to climb the object, and then spring from it to engage the dispenser 100. The dispenser could also move rapidly toward walls or other objects with a pet in chase, and then quickly change direction or bounce off the object so that the pet will have to rebound from the surface of the object or wall or otherwise use agility and/or strength to negotiate or avoid the object, and thereby build fitness, skills and alertness. In an exemplary embodiment, the dispenser 100 can be programmed to act like prey and provide access to or dispense/eject food in response to specific animal behaviors to stimulate pets or teach young, orphaned wild animals hunting or survival skills so they can be released into the wild. The dispenser 100 can be programmed to randomly dispense food in response to the animal catching the dispenser, or in other words to dispense food as a combination of both a) the animal catching the dispenser and b) a probability function (a computerized "rolling of a die"), to reinforce the hunting and stalking behavior or habit so that the animal will keep trying even when it is sometimes unsuccessful. Of course the dispenser 100 can be provided in any size with corresponding characteristics of speed, strength, mass, and so forth to be appropriate for a particular animal or application. Pressure sensors and/or optical sensors on the dispenser 100 can indicate when the animal has "caught" the dispenser 100 for purposes of ending the chase and beginning the reward phase. For example, an amount of weight pressing on or down on the dispenser 100 exceeds a default or user-configurable threshold, a certain number of optical sensors are shut away from light, and so forth.

The dispenser 100 can be provided with a data port so that the controller 112 can be connected directly to a computing device so that information including history observed by the dispenser 100, programs for the dispenser 100, and other configuration or operational information can be transferred or exchanged between the computing device and the dispenser 100. The transfer mechanism can be implemented via wireless radio frequency transmissions, via infrared communication signals, via a serial or parallel data cable that conveys electrical or optical signals, and so forth.

Figure 3:
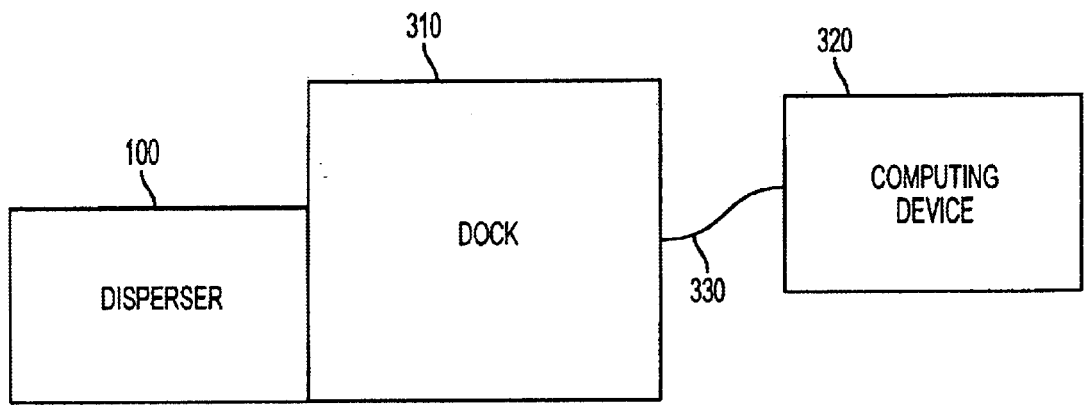
FIG. 3 illustrates a mobile interactive food dispenser connected to a dock, and a computing device connected to the dock, in accordance with exemplary embodiments of the invention.

The controller 112 can monitor the level(s) of food or payload within the dispenser 100, and can be programmed or configured to provide alerts such as periodic aural tones, an indicator or status lamp such as an LED (Light Emitting Diode) display or lamp or an LCD (Liquid Crystal Display) display, and/or can automatically seek out a reloading station and dock with a reloading station and automatically refill supplies of food(s) or other payload(s) so that the dispenser 100 is replenished automatically. The dock or reloading station can also replenish the dispenser 100 with power, for example by providing electricity to recharge the dispenser's rechargeable battery pack or by providing a replacement battery or power pack. The dock or reloading station can also be provided with a data port and a connection to a local or remote computing device, so that data can be transferred between the dispenser 100 and the computing device (to transfer history or data regarding the pet and the dispenser's actions and status to the computing device, to transfer new instructions, programs or configuration information from the computing device to the dispenser, and so forth). In this way, for example, a pet owner on vacation could access the computing device and/or the dispenser 100 via a dialup connection, an Internet connection, and so forth and obtain a report of the pet's behavior and health. The connection between the dispenser 100 and the dock or reloading station can be an electrical cable connection, an optical connection, a wireless connection, or any connection for conveying information between the dispenser 100 and the dock. The dispenser 100 can be configured with serial and/or parallel data ports or connections, and so forth, for connecting to the dock or another computing device for example a laptop or desktop computer. FIG. 3 illustrates an exemplary embodiment wherein the dispenser 100 is docked or connected to a dock or reloading station 310, which is in turn connected to a computing device 320 via a connection 330.

In an exemplary embodiment, the dock or reloading station can provide the dispenser 100 with an exchange module that contains a fresh battery pack or power source, a full food container (optionally provided with access doors and corresponding servos controllable by the controller 112 of the dispenser 100), and a data package (for example, a flash memory module) in a single or integrated unit. The exchange received by the dock or reloading station in the exchange can include data recorded by the dispenser 100 onto the data package of the exchange module. The dock or reloading station can also be provided with a beacon, for example an aural beacon, a light beacon, or a radio frequency beacon, to help the dispenser 100 locate the dock or reloading station and/or discern the status of the station or of the docking process. In an exemplary embodiment, the dock or reloading station can query or call the dispenser 100, can discern the food or payload loading levels and dispense appropriate amounts to top off or replenish the dispenser's reserves, and/or can dispense food or payload at the request of the dispenser 100 and in an amount or duration requested by the dispenser 100, for example until the dispenser 100 signals the dock or reloading station to cease dispensing.

The dock or reloading station can be located on a horizontal surface accessible to the dispenser 100 so that the dispenser 100 can simply move into engagement with the dock, or the dock can be located above a docking point or location so that when the dispenser 100 is located at the docking point or location, the dispenser descends into engagement with the dispenser 100.

The dispenser configuration shown in FIGS. 1 and 2 is well suited to moving over horizontal and/or inclined surfaces. In addition or alternatively, the dispenser 100 can be configured to provide vertical motion, for example by extending or contracting its shell 102, or by climbing a pole, rope or cable (vertically or diagonally arranged) for example via a winch, gripping gear mechanism, or gripping lever mechanism, to provide movement suitable for stimulating (or avoiding) the pet in question. Alternatively, a shell containing food or payload and any doors/access panels or access-controlling devices can be mounted on a vertical track, and moved along the track and actuated by an electric motor, electronic controller and power supply concealed in a container attached to the wall, ceiling or floor and connected to the shell and the vertical track.

In an exemplary embodiment, multiple dispensers 100 can be programmed or configured to act in concert, for example with respect to one or multiple animals, to provide greater and more varied stimulation to the animal(s). In this embodiment the dispensers 100 can be configured to communicate with each other to exchange status, location, and program information, and can act co-equally or hierarchically (where for example one of the dispensers 100 controls or direct the other dispenser(s)). For example, one of the dispensers 100 can engage the animal's attention, and then another dispenser can approach and engage the animal from a different direction so that the animal must respond to both dispensers 100. For example, the dispensers 100 can be equipped with grasping devices, to play a game of "Keep Away" with the animal, or propel one or more toys such as balls in different directions. Alternatively, dispensers 100 can locate themselves apart from each other and then perform actions to attract or stimulate the animal, for example simultaneously or sequentially, so that the animal runs from one dispenser 100 to the next dispenser 100, thereby maximizing the animal's exercise intensity.

The controller 112 can behave in different way, or modify it's behavior, depending on all or any combination of: the pet's behavior, an amount or type of food or payload, ambient light conditions, ambient temperatures, time of day, type of animal, past history of interaction with a particular animal, instructions and/or configuration information provided by the user/pet owner, and so forth.

In an exemplary embodiment, the dispenser 100 can be provided with limbs or appendages that can be actuated or controlled, with lights or surfaces that change color or brightness, with speakers that emit sounds (for example, of prey, of peer animals, of humans, or any desired sounds), and other devices or capabilities for interacting with and engaging the interest of animals. For example, the dispenser 100 can be provided with a skin whose color and/or shade can be electronically controlled by the controller 112, so that the dispenser 100 can assume the color and color pattern of prey animals, peer animals (such as playmates) or objects that interest the particular pet or pets that the dispenser 100 is tasked with stimulating and/or feeding.

Those skilled in the art will appreciate that the elements and methods or processes described herein can be implemented using a microprocessor, computer, or any other computing device, and can be implemented in hardware and/or software, in a single physical location or in distributed fashion among various locations or host computing platforms. Agents can be implemented in hardware and/or software or computer program(s) at any desired or appropriate location. Those skilled in the art will also appreciate that software or computer program(s) can be stored on a machine-readable medium, wherein the software or computer program(s) includes instructions for causing a computing device such as a computer, computer system, microprocessor, or other computing device, to perform the methods or processes.

It will also be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A mobile food dispenser comprising:
   a shell;
   a controller;
   at least one drive motor for moving the dispenser across a surface in different speeds and directions in response to direction from the controller;
   at least one sensor configured to detect the presence of an animal; and
   at least one compartment including an access mechanism for controlling the animal's access to food contained within the compartment, wherein the access mechanism is actuated by the controller; wherein
   the controller is configured to move the dispenser and actuate the access mechanism to stimulate the animal, in response to a detected presence of the animal.

2. The dispenser of claim 1, comprising at least one sensor configured to discern an environment surrounding the dispenser.

3. The dispenser of claim 2, wherein:
   the at least one sensor configured to detect the presence of an animal comprises at least one of a motion detector, an infrared detector, an optical sensor, and a microphone; and
   the at least one sensor configured to discern an environment surrounding the dispenser comprises at least one of a proximity switch, a range-finder, an infrared detector, and an optical sensor.

4. The dispenser of claim 2, wherein the dispenser allows access to the food according to a predetermined schedule.

5. The dispenser of claim 2, wherein the dispenser allows access to the food in response to specific behavior of the animal.

6. The dispenser of claim 5, wherein the specific behavior includes an activity level of the animal rising above a threshold.

7. The dispenser of claim 5, wherein the specific behavior includes a sound emitted by the animal.

8. The dispenser of claim 5, wherein the specific behavior includes the animal contacting the dispenser with an amount of force above a threshold.

9. The dispenser of claim 5, wherein the dispenser moves to stimulate the animal to chase the dispenser, and allows access to the food after the animal catches the dispenser.

10. The dispenser of claim 9, wherein when the animal catches the dispenser, the dispenser allows access to the food according to a random probability.

11. The dispenser of claim 5, wherein the dispenser's response to the animal varies based on the time of day.

12. The dispenser of claim 5, wherein the dispenser's response to the animal varies based on an ambient temperature.

13. The dispenser of claim 5, wherein the dispenser's response to the animal varies based on an amount of ambient light.

14. The dispenser of claim 5, wherein the dispenser's response to the animal varies based on an amount of food remaining in the dispenser.

15. The dispenser of claim 5, wherein the dispenser allows access to a first food according to a predetermined schedule, and dispenses a second food in response to specific behavior of the animal.

16. The dispenser of claim 5, wherein the dispenser distinguishes between or recognizes different animals, and responds differently to the different animals.

17. The dispenser of claim 5, wherein the dispenser receives and immediately acts upon remote control instructions, and stores and repeats the received instructions.

18. The dispenser of claim 5, wherein the dispenser periodically initiates interaction with the animal to stimulate the animal.

19. The dispenser of claim 18, wherein the dispenser mimics the actions of prey to stimulate the animal to chase or engage the dispenser.

20. The dispenser of claim 19, wherein the dispenser moves near obstacles or objects in an ambient environment while being chased by the animal, to force or encourage the animal to use agility and/or strength to negotiate or avoid the object.

21. The dispenser of claim 5, wherein the dispenser includes means for recording behavior of the dispenser and of the animal, and means for transferring the recorded information to a receiving device external to the dispenser.

22. A system comprising a plurality of mobile food dispensers, each mobile food dispenser including a shell, a controller, at least one drive motor for moving the dispenser across a surface in different speeds and directions in response to direction from the controller, at least one sensor configured to detect the presence of an animal, at least one sensor configured to discern an environment surrounding the dispenser, and at least one compartment including an access mechanism for controlling the animal's access to food contained within the compartment, wherein the access mechanism is actuated by the controller, wherein the controller is configured to move the dispenser and actuate the access mechanism to stimulate the animal, in response to a detected presence of the animal;

wherein the dispensers communicate with each other and act in concert to stimulate the animal.

23. The dispenser of claim 1, together with a dock that replenishes food and/or energy stores of the dispenser when the dispenser physically engages the dock.

* * * * *